Aug. 31, 1926.
W. G. CHAUSSE
1,598,051
TOOL HEATING VEHICLE
Filed July 23, 1923    4 Sheets-Sheet 4
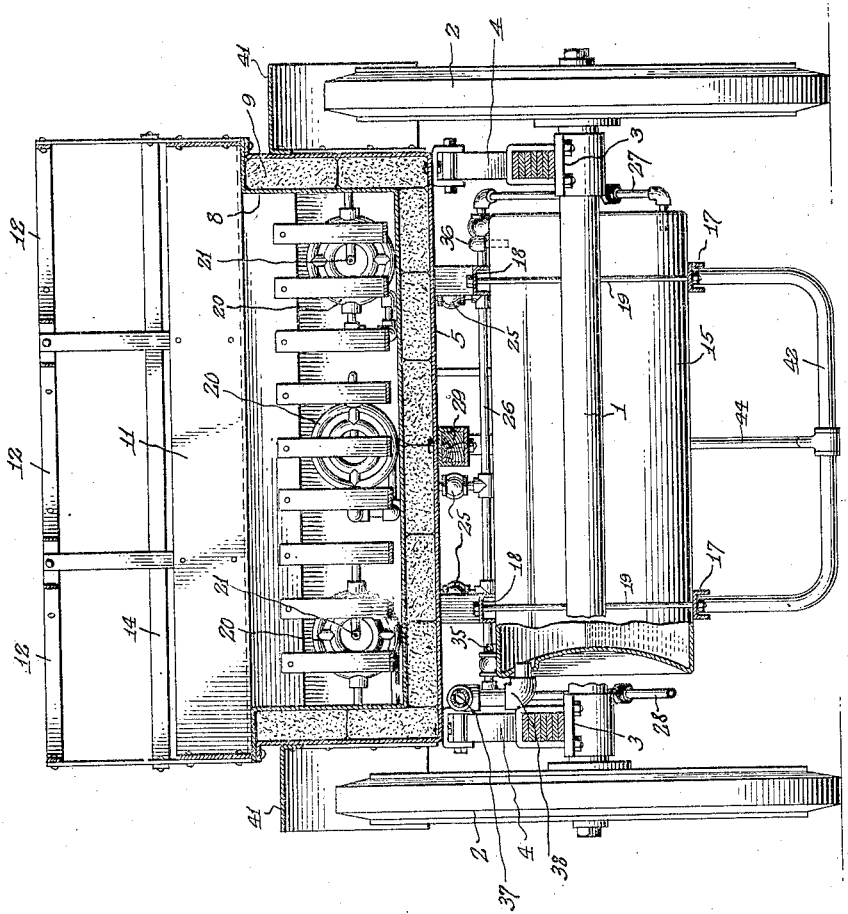
Inventor
Wilfrid G. Chausse,
By
Attorneys Patented Aug. 31, 1926.

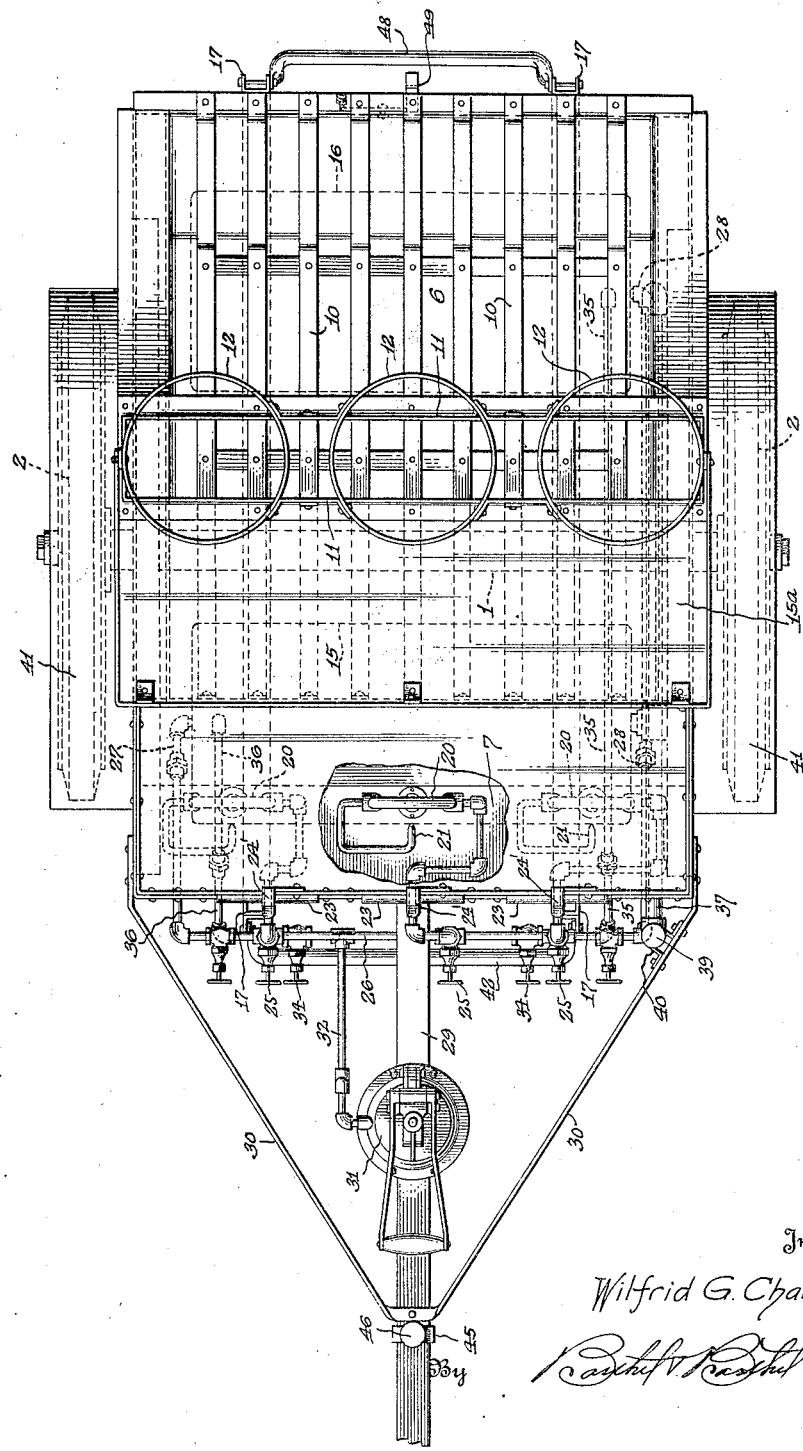

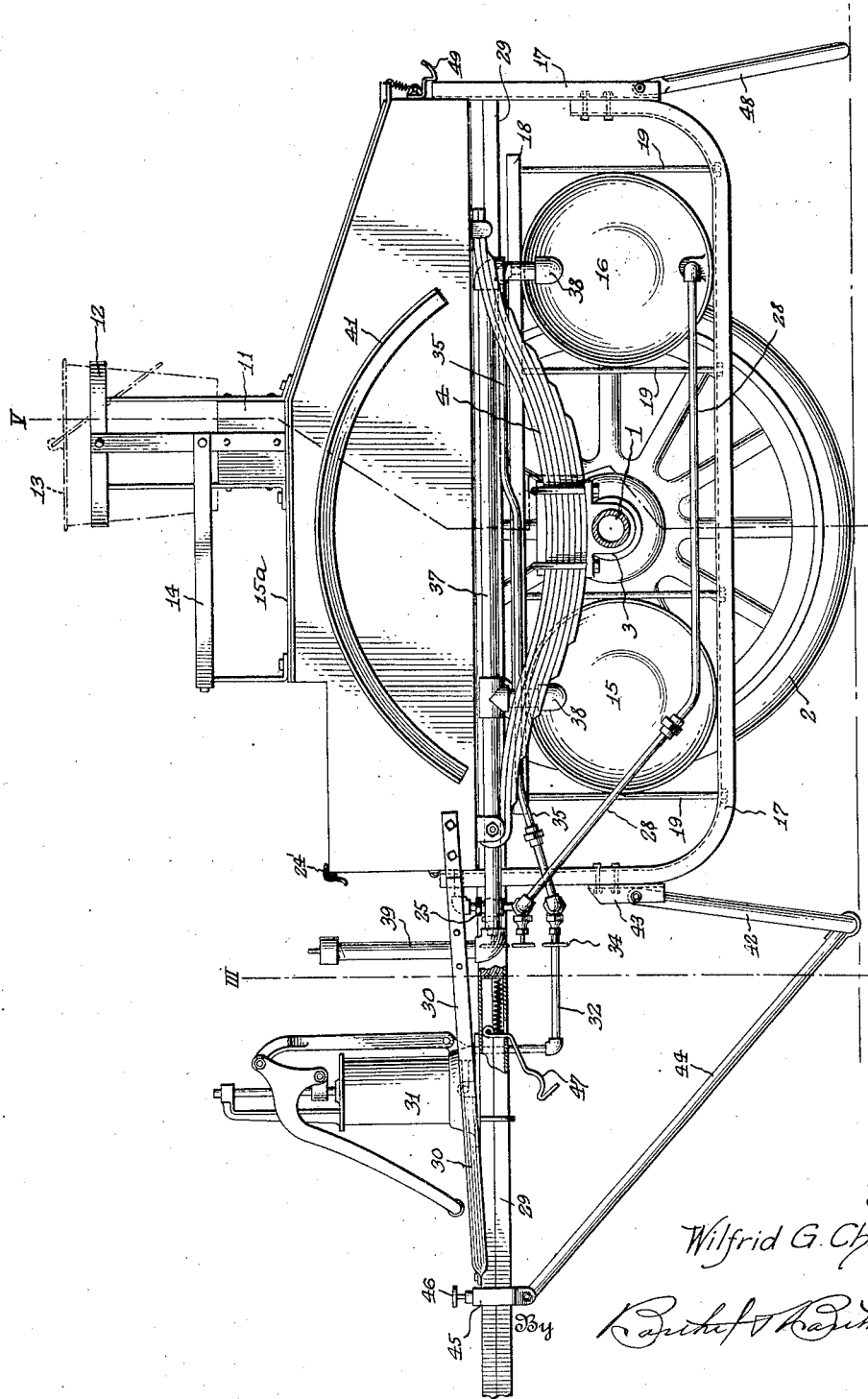

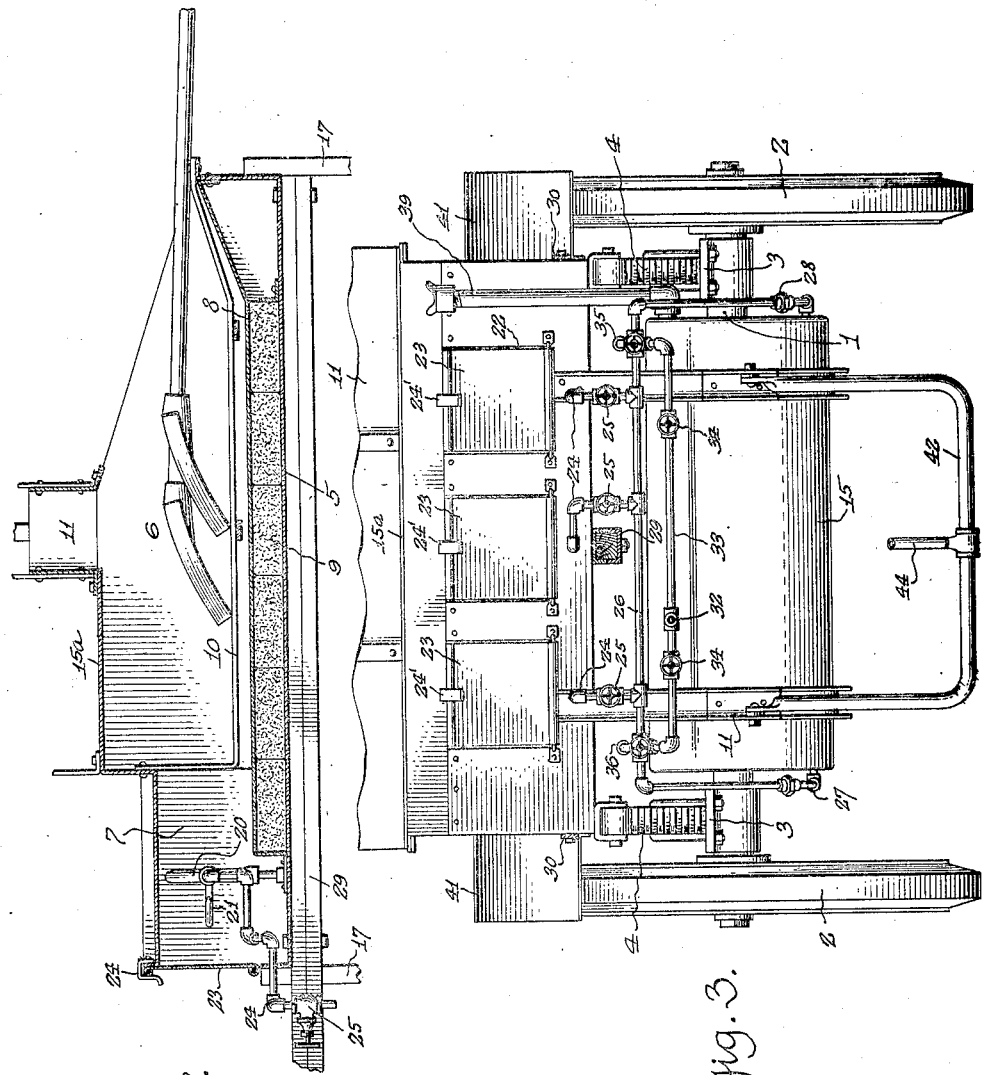

1,598,051

UNITED STATES PATENT OFFICE.

WILFRID G. CHAUSSE, OF DETROIT, MICHIGAN.

TOOL-HEATING VEHICLE.

Application filed July 23, 1923. Serial No. 653,184.

In the laying of asphalt pavements, tampers, smoothing irons and other forms of tools are used which must be heated and small quantities of asphaltum, tar and other material are often required in a heated condition for patching, filling in, or otherwise completing a pavement.

My invention aims to provide a tool heating vehicle that may be moved about and conveniently located for heating the tools and small quantities of material used in the laying of an asphalt pavement. The vehicle includes a tool heating chamber and gas generated from oil is used as a fuel for heating the chamber and tools placed therein.

My invention further aims to provide an oil burning tool heater wherein air is supplied to reservoirs containing oil or other liquid fuel to cause the oil to be fed, under pressure, to gas generators communicating with jets or burners that provide flames of a high caloric value for expeditiously and economically heating tools.

My invention further aims to provide a single truck tool heating vehicle on which truck the tool heating chamber, fuel reservoirs, pump, and other parts are distributed so that the load is balanced as near as possible relative to the truck, and provision is made for substantially supporting the vehicle when in use to prevent accidental tilting. The manner in which the body of the vehicle is balanced relative to its truck permits of the load being easily moved by another vehicle or by hand.

Other features of my invention will hereinafter appear as the vehicle is described by aid of the drawings wherein:—

Figure 1 is a plan of the tool heating vehicle partly broken away;

Fig. 2 is a side elevation of the same, partly broken away and partly in section;

Fig. 3 is a cross sectional view of the vehicle taken on the line III—III of Fig. 2;

Fig. 4 is a longitudinal sectional view of a portion of the vehicle showing the tool heating chamber, and Fig. 5 is a cross sectional view of the vehicle taken on the line V—V of Fig. 2, the wheels of the vehicle being shown in end elevation.

The vehicle includes a two-wheeled truck having an axle 1 supported by opposed wheels 2, and mounted on the axle 1 are perches 3 for leaf springs 4 having the ends thereof connected to the bottom of a substantially rectangular body 5 in the form of a hearth providing a tool heating chamber 6 and a burner chamber 7. These chambers are the full width of the body 5 and the burner chamber 7 may be considered as being at the forward end of said body. The inner side and bottom walls of the tool heating chamber are provided with casing 8 containing fire brick 9 or other non-fusible insulating material which will prevent the body of the vehicle from warping or becoming distorted because of the heat generated in the tool chamber 6. The rear end of the tool chamber is open so that tools may be placed in said chamber on a foraminous or lattice support 10 therein, and the top of the tool heating chamber communicates with a transversely disposed outlet member 11 provided with a receptacle rack 12 in which buckets or other receptacles 13 may be placed, on the outlet member 11, so that the contents of said buckets or receptacles may be heated from the tool heating chamber 6. The rack 12, also has a forward extension 14 which permits of receptacles or tools being placed on the top wall 15ª of the tool heating chamber 6.

Under the body 5 are transversely disposed fuel tanks or reservoirs 15 and 16 supported by longitudinally disposed U-shaped frames or hangers 17 on which the reservoirs are retained by clamping bars 18 and tie rods 19.

Mounted in the burner chamber 7 are a plurality of gas generators 20 supporting gas burners or nozzles 21 with the burners or nozzles co-axially of the generators so as to subject the generators to the heat of ignited gas at the burners or jets. Access is had to said burners for igniting the gas, through openings 22 in the front wall of the body 5, said openings being normally closed by bottom hinged doors 23 held in closed positions by clips 24'. Communicating with the gas generators 20 are oil supply pipes 24 having control valves 25 and said pipes are connected to a transversely disposed pipe or header 26, one end of which is connected by a pipe 27 to one end of the reservoir 15, and the opposite end of the pipe or header 26 is connected by a pipe 28 to one end of the reservoir 16.

Under the body 5 is a central longitudinally disposed tongue 29 which projects from the forward end thereof and the forward end of said tongue is connected to the forward end of the body 5 by straps 30, Mounted on the forward end of the tongue 29 is a conventional form of hand operated air pump 31 adapted to receive air and force it into a pipe 32 communicating with a transversely disposed pipe or header 33 provided with control valves 34. One end of the header 33 is connected by a pipe 35 to the top of the reservoir 16 and the opposite end of said header is connected by a pipe 36 to the top of the reservoir 15, thus permitting of air under pressure being placed in the reservoirs to force the oil or fuel from said reservoirs into the gas generators 20. Oil or other fuel may be placed in the reservoirs 15 and 16 through a filling pipe 37 having branches 38 connected to the ends of the reservoirs 15 and 16, and an upstanding capped branch 39 which permits of the reservoirs being conveniently filled. The pipe 37 and its branches may be supported by the reservoirs, also by a bracket 40 connected to one of the straps 30. See Fig. 1.

On the sides of the body 5 are fenders 41 for the wheels 2 and at the forward end of the vehicle is a swingable U-shaped leg 42 having its ends pivotally connected to brackets 43 carried by the frames 17. The leg 42 is provided with a pivoted brace 44 connected to a slide head 45 on the tongue 29, said slide head being fixed relative to the tongue by a set screw 46. The brace 44 may be employed to hold the leg 42 in engagement with the ground, but by permitting the slide head 45 to shift forwardly on the tongue 29, the leg 42 can be swung upwardly into engagement with a spring pressed pivoted keeper 47 carried by the tongue 29.

At the rear end of the body 5 and pivotally connected to the frame 17 is another U-shaped leg 48 which may be swung upwardly into engagement with a keeper 49 carried by the rear end of the body 5.

Air may be pumped into the reservoirs in order to supply oil to the generators in sufficient quantities for the production of gas and the intensity of the flames at the burners may be regulated by controlling the supply of oil to the gas generators. With the gas flames projected into the tool heating chamber of the vehicle body the tools placed on the foraminous frame in the heating chamber may be quickly heated and the heated air utilized for heating any receptacles or tools placed on the body.

When the vehicle is being used as a tool heater the end legs will substantially support the vehicle, and with these legs shifted to inactive positions the vehicle tongue may be used for pulling or pushing the vehicle from one location to another.

While in the drawings there is illustrated a preferred embodiment of my invention, it is to be understood that the structural elements are susceptible to such changes, in size, shape and manner of assembling, as fall within the scope of the appended claims.

What I claim is:—

1. In a tool heating vehicle, a truck having an axle, a body above said truck axle, said body having a heating compartment and a burner compartment, said heating compartment having a covered forward part and an open rear part, and a tool support suspended in said heating compartment and extending along the bottom of said compartment to the rear open part of said body.

2. In a tool heating vehicle, the combination of a truck, an open hearth, a burner chamber at the forward end of said hearth, burners in said chamber arranged to direct flames over said hearth, hangers carried by said truck below said hearth, and fuel supply means on said hangers adapted to supply fuel to said burners.

3. In a tool heating vehicle, the combination with a truck having an axle, a body on said truck above the axle thereof, said body being in the form of an open hearth, a tool support spaced above the hearth and extending rearwardly to the end of said body, a burner chamber at the forward end of said body, burners therein directed over the hearth, and fuel supply means for said burner disposed under said body at each side of the axle thereof.

4. In a tool heating vehicle, the combination of a truck having an axle, a tool heating hearth body carried by said truck above said axle, a burner housed at the forward end of said hearth, and a pair of oil tanks carried by said truck, with said tanks disposed substantially parallel to said truck axle and at opposite sides thereof.

5. A tool heating vehicle as called for in claim 1, further characterized by an outlet member on said body for the heating compartment thereof, and a tool rack on top of said body at the side of said outlet member, said rack and outlet member being adapted for holding tools.

In testimony whereof I affix my signature.

WILFRID G. CHAUSSE.